(12) United States Patent
Yang et al.

(10) Patent No.: US 9,972,916 B2
(45) Date of Patent: May 15, 2018

(54) PLANAR ARRAY ANTENNA WITH CHANGEABLE BEAM ANGLE

(71) Applicants: Tsinghua University, Beijing (CN); Beijing Sense-ID Technology Co., Ltd., Beijing (CN)

(72) Inventors: Fan Yang, Beijing (CN); Xiangfei Xu, Beijing (CN); Shenheng Xu, Beijing (CN); Lin Gao, Beijing (JP)

(73) Assignees: TSINGHUA UNIVERSITY, Beijing (CN); BEIJING SENSE-ID TECHNOLOGY CO., LTD., Beijing (CN)

( * ) Notice: Subject to any disclaimer, the term of this patent is extended or adjusted under 35 U.S.C. 154(b) by 31 days.

(21) Appl. No.: 15/357,114

(22) Filed: Nov. 21, 2016

(65) Prior Publication Data

US 2017/0162949 A1    Jun. 8, 2017

(30) Foreign Application Priority Data

Dec. 7, 2015   (CN) .......................... 2015 1 0890728

(51) Int. Cl.
*H01Q 21/06*   (2006.01)
*H01Q 15/16*   (2006.01)
(Continued)

(52) U.S. Cl.
CPC ............. *H01Q 21/061* (2013.01); *H01Q 3/02* (2013.01); *H01Q 3/46* (2013.01); *H01Q 15/16* (2013.01);
(Continued)

(58) Field of Classification Search
CPC .......... H01Q 21/061; H01Q 3/02; H01Q 3/46; H01Q 15/16; H01Q 1/28; H01Q 1/3275; H04B 5/0037
See application file for complete search history.

(56) References Cited

U.S. PATENT DOCUMENTS 6,473,057 B2 * 10/2002 Monzon .................. H01Q 3/14
                                                                343/754
2007/0285327 A1 * 12/2007 Paschen ................. H01Q 3/14
                                                                343/754

FOREIGN PATENT DOCUMENTS

WO        0245207 A2    6/2002

OTHER PUBLICATIONS

The State Intellectual Property Office of People's Republic of China, First Office Action for CN201510890728.0, dated Oct. 17, 2016.

* cited by examiner

Primary Examiner — Dameon E Levi
Assistant Examiner — David Lotter
(74) Attorney, Agent, or Firm — Hodgson Russ LLP

(57) ABSTRACT

The present disclosure provides a planar array antenna. The planar array antenna includes a plurality of phase modulation surfaces, in which each phase modulation surface includes an array including a plurality of transmission phase-shift elements; and a planar power source, configured to power the plurality of phase modulation surfaces, in which each phase modulation surface is configured to modulate a transmission phase of an electromagnetic wave based on the plurality of transmission phase-shift elements, and the plurality of phase modulation surfaces are controlled to change a relative position to change the beam angle based on the corresponding transmission phases. The planar array antenna may be installed in a conformal manner on surfaces of the mobile device, such as a vehicle, an aircraft, a ship or the like.

3 Claims, 3 Drawing Sheets

(51) Int. Cl.
*H04B 5/00* (2006.01)
*H01Q 3/02* (2006.01)
*H01Q 3/46* (2006.01)
H01Q 1/28 (2006.01)
H01Q 1/32 (2006.01)

(52) U.S. Cl.
CPC ............ *H04B 5/0037* (2013.01); *H01Q 1/28* (2013.01); *H01Q 1/3275* (2013.01)

PLANAR ARRAY ANTENNA WITH CHANGEABLE BEAM ANGLE

CROSS-REFERENCE TO RELATED APPLICATIONS

This application is based upon and claims a priority to Chinese Patent Application Serial No. 201510890728.0, filed with the State Intellectual Property Office of P. R. China on Dec. 7, 2015, the entire contents of which are incorporated herein by reference.

FIELD

The present disclosure generally relates to field of an antenna, and more particularly, to a planar array antenna with a changeable beam angle.

BACKGROUND

A manner of scanning a beam in space is classified as a mechanical scan, an electronic scan or the like. At present, a common high gain antenna having a capability of scanning the beam in space is a parabolic antenna based on the mechanical scan or a phased-array antenna based on the electronic scan.

Since an orientation of the beam received (emitted) by the parabolic antenna is settled, it needs to rotate the parabolic antenna to fit the orientation of the beam when the beam is scanned in space. Therefore, the parabolic antenna has disadvantages of a great rotatory inertia, a slow speed and the like. Furthermore, since the parabolic antenna scans the beam mechanically, the parabolic antenna is bulky and has a complex structure. In consideration of limitation of the above disadvantages, the parabolic antenna is not suitable for a mobile platform, such as a vehicle, an aircraft, a satellite and the like.

Although overcoming the disadvantages caused by the parabolic antenna when the beam is scanned, and having advantages of a high beam scanning speed and a high phase varying speed, the phased-array antenna has a small application scope due to a complex structure.

SUMMARY

The present disclosure aims to solve at least one of the above problems.

Accordingly, an objective of the present disclosure is to provide a planar array antenna with a changeable beam angle.

In order to achieve the above objective, embodiments of the present disclosure provide a planar array antenna with a changeable beam angle, comprising: a plurality of phase modulation surfaces, wherein each phase modulation surface comprises an array comprising a plurality of transmission phase-shift elements; and a planar power source, configured to power the plurality of phase modulation surfaces, wherein each phase modulation surface is configured to modulate a transmission phase of an electromagnetic wave based on the plurality of transmission phase-shift elements, and the plurality of phase modulation surfaces are controlled to change a relative position to change the beam angle based on the corresponding transmission phases.

The planar array antenna according to embodiments of the present disclosure, by using new phase modulation surfaces and a manner of modulating phases with cooperation between the phase modulation surfaces, and by adopting the planar power source which is the near-field feed excitation source, abandons the far-field feed manner of the traditional antenna, and has advantages of a low-profile, a large scanning area, a high radiant efficiency, a simply and reliable system, a low cost and the like totally. The planar array antenna may be installed in a conformal manner on surfaces of the mobile device, such as a vehicle, an aircraft, a ship or the like.

Additionally, the planar array antenna according to embodiments of the present disclosure further includes followings.

Further, an absolute value of an magnitude of a transmission coefficient of each transmission phase-shift element is less than 1, and a transmission phase of each transmission phase-shift element is adjustable in a range from 0 degree to 360 degree, and each transmission phase-shift element comprises, but is not limited to, a four-layer double-square-ring element, a three-layer spiral-dipole element, a perforated medium element, or the like.

Further, the plurality of phase modulation surfaces comprise a first phase modulation surface and a second phase modulation surface, first transmission phases of the transmission phase-shift elements comprised in both of the first phase modulation surface and the second phase modulation surface are set to be distributed by gradient in columns, and a different of the first transmission phases in the adjacent columns is denoted by a formula of $$\Delta\varphi = \pi \cdot d \cdot \sin(\theta)/\lambda$$

wherein $\Delta\varphi$ is the difference between the first transmission phases, d is a separation distance between the adjacent columns, $\theta$ is a scanning elevation angle, and $\lambda$ is a wavelength of the electromagnetic wave.

Further, final transmission phases of the transmission phase-shift elements comprised in the first phase modulation surface are set according to a formula of $$\varphi_{1i} = \varphi_i + \varphi(r_i) + \varphi_1$$

wherein $\varphi_{1i}$ is the final transmission phase of an $i^{th}$ transmission phase-shift element comprised in the first phase modulation surface, $\varphi_i$ is the first transmission phase of the $i^{th}$ transmission phase-shift element comprised in the first phase modulation surface, $\varphi(r_i)$ is a second transmission phase related with a distance between the $i^{th}$ transmission phase-shift element and a center of the first phase modulation surface, and $\varphi_1$ is a constant; and final transmission phases of the transmission phase-shift elements comprised in the second phase modulation surface are set according to a formula of $$\varphi_{2i} = \varphi_i(r_i) + \varphi_2$$

wherein $\varphi_{2i}$ is the final transmission phase of an $i^{th}$ transmission phase-shift element comprised in the second phase modulation surface, $\varphi_i$ is the first transmission phase of the $i^{th}$ transmission phase-shift element comprised in the second phase modulation surface, $\varphi(r_i)$ is the second transmission phase related with the distance between the $i^{th}$ transmission phase-shift element and a center of the second phase modulation surface, and $\varphi_2$ is a constant.

Further, the planar array antenna further includes a rotating device, configured to rotate each or all of the plurality of phase modulation surfaces.

Further, the planar power source comprises, but is not limited to, a micro strip array, a slot array, or the like.

The circumferential phase distribution of the transmission phase-shift elements of the phase modulation surface of embodiments of present disclosure may eliminate the antenna grating lobe, and reduce the antenna side lobe and realize the polarization of antenna. Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

The above and/or additional aspects and advantages of embodiments of the present disclosure will become apparent and more readily appreciated from the following descriptions made with reference to the drawings, in which.

DETAILED DESCRIPTION

Figure 1:
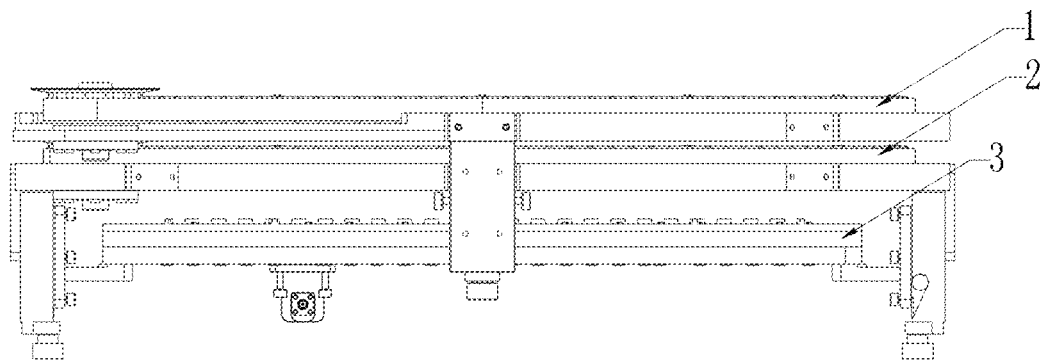
FIG. 1 is a plan view of a planar array antenna according to an embodiment of the present disclosure.

Reference will now be made in detail to exemplary embodiments, examples of which are illustrated in the accompanying drawings. The same or similar elements and elements having same or similar functions are denoted by like reference numerals throughout the descriptions. The embodiments described herein with reference to the accompanying drawings are explanatory and used to generally understand the present disclosure, which is not construed to limit the embodiments of the present disclosure.

In the specification, unless specified or limited otherwise, relative terms such as "central", "longitudinal", "lateral", "front", "rear", "right", "left", "inner", "outer", "lower", "upper", "horizontal", "vertical", "above", "below", "up", "top", "bottom" as well as derivative thereof (e.g., "horizontally", "downwardly", "upwardly", etc.) should be construed to refer to the orientation as then described or as shown in the drawings under discussion, are only used to simplify description of the present invention, and do not alone indicate or imply that the device or element referred to must have a particular orientation These relative terms are for convenience of description and do not require that the present disclosure be constructed or operated in a particular orientation. In addition, terms such as "first" and "second" are used herein for purposes of description and are not intended to indicate or imply relative importance or significance.

In the description of the present disclosure, it should be understood that, unless specified or limited otherwise, the terms "mounted," "connected," and "coupled" and variations thereof are used broadly and encompass such as mechanical or electrical mountings, connections and couplings, also can be inner mountings, connections and couplings of two components, and further can be direct and indirect mountings, connections, and couplings, which can be understood by those skilled in the art according to the detail embodiment of the present disclosure.

Referring to the following descriptions and drawings, these and other aspects of the embodiments of the present disclosure will be apparent. In these descriptions and drawings, some specific approaches of the embodiments of the present disclosure are provided, so as to show some ways to perform the principle of the embodiments of the present disclosure, however it should be understood that the embodiment of the present disclosure is not limited thereby. Instead, the embodiments of the present disclosure comprise all the variants, modifications and their equivalents within the spirit and scope of the present disclosure as defined by the claims.

A planar array antenna according to embodiments of the present disclosure will be described in combination with drawings.

Figure 2:
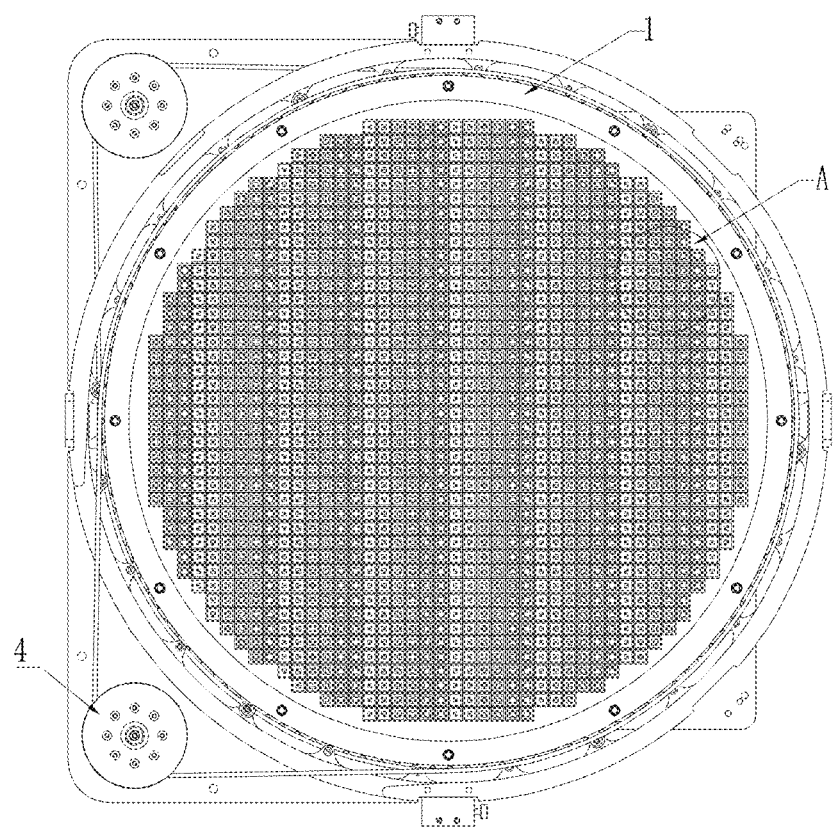
FIG. 2 is a top view of a planar array antenna according to an embodiment of the present disclosure.

Please refer to FIGS. 1 and 2. In embodiments of the present disclosure, the planar array antenna includes: a plurality of phase modulation surfaces, in which each phase modulation surface includes an array including a plurality of transmission phase-shift elements; and a planar power source, configured to power the plurality of phase modulation surfaces, in which each phase modulation surface is configured to modulate a transmission phase of an electromagnetic wave based on the plurality of transmission phase-shift elements, and the plurality of phase modulation surfaces are controlled to change a relative position to change the beam angle based on the corresponding transmission phases.

In an embodiment of the present disclosure, the planar array antenna includes a first phase modulation surface 1, a second phase modulation surface 2 and a planar power source 3. The planar power source 3 is configured to power the first phase modulation surface 1 and the second phase modulation surface 2. The incident wave beam may go through the first phase modulation surface 1 and then the phase may be changed. The wave beam with changed phase may go through the second phase modulation surface 2 again and then the phase may be changed again. The manner of changing the phase through the first phase modulation surface 1 and the second phase modulation surface 2 is similar to that of the wedge prism. The beam phase control may be realized by the first phase modulation surface 1 and the second phase modulation surface 2. It is noted that, in the above embodiments, two phase modulation surfaces may be set to realize the control of beam phase, and those skilled in the art may set multiple phase modulation surfaces to combine with each other, so as to realize the phase control.

Figure 3:
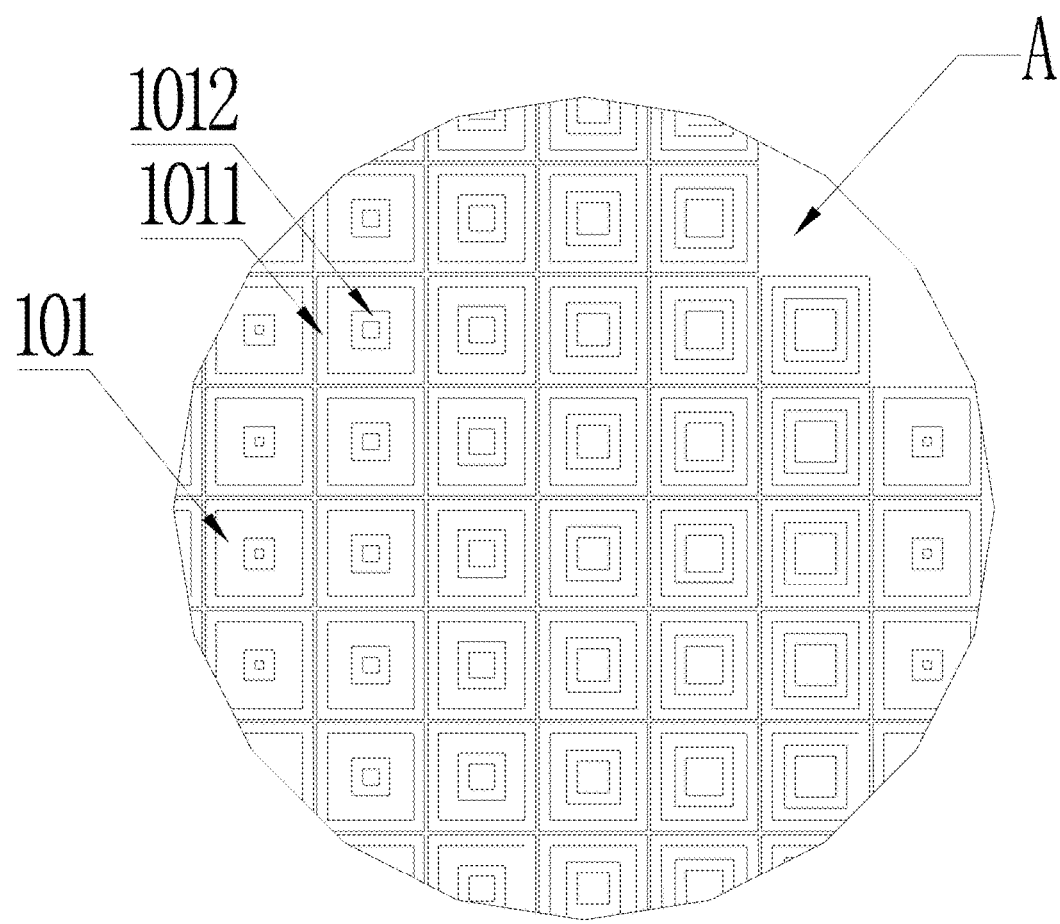
FIG. 3 is a detail view of FIG. 2 at a position A.
Figure 4:
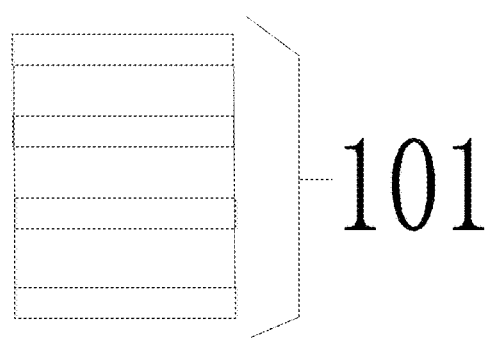
FIG. 4 is a schematic diagram illustrating a transmission phase-shift element according to an embodiment of the present disclosure.
Figure 5:
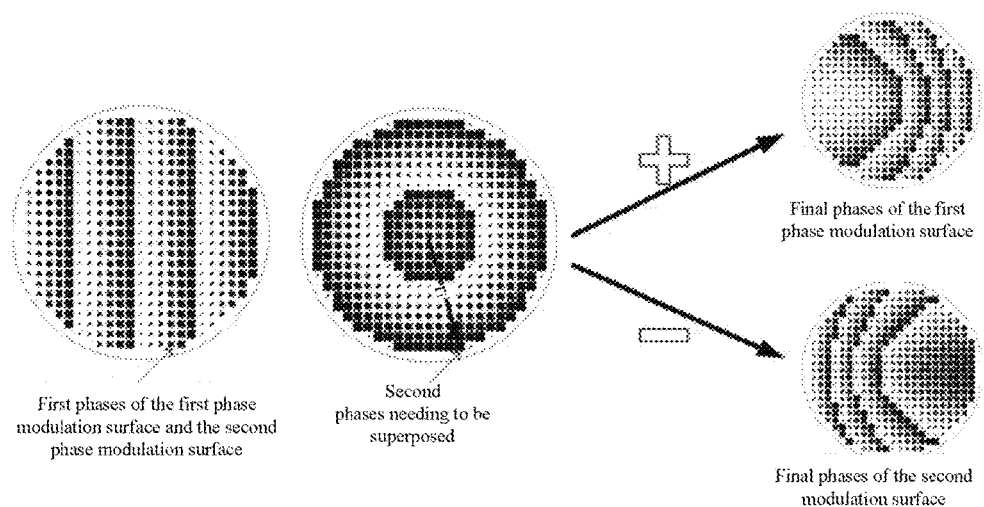
FIG. 5 is a schematic diagram illustrating superimposed phases between phases of a first phase modulation surface and phases of a second phase modulation surface according to an embodiment of the present disclosure.

As shown in FIG. 3 and FIG. 4, in an embodiment of the present disclosure, the first phase modulation surface 1 includes the plurality of transmission phase-shift elements: four-layer double-square-ring elements 101. The transmission phase-shift element 101 includes four layers, and among the four layers are provided with insulating medium layers. Each layer includes a first square ring 1011 and a second square ring 1012. The second square ring 1012 is inside the first square ring 1011. The phase delay of the transmission phase-shift element 101 may be adjusted by adjusting the distance between the first ring 1011 and the second ring 1012. Each transmission phase-shift element included in the second phase modulation surface 2 employs a four-layer structure similar to each transmission phase-shift element 101 included in the first phase modulation surface 1. However, sizes of square rings included by the second adjustment surface 2 are same with or different from sizes of the first square ring 1011 and the second square ring 1012.

In an embodiment of the present disclosure, the transmission phase-shift element 101 may further be a three-layer spiral-dipole element or a perforated medium element In an embodiment of the present disclosure, a central frequency of the transmission phase-shift element 101 is 12.5 GHz, and a periodic element interval is 10.32 mm which is 0.43 times of a wavelength based on an operating frequency. Dielectric layers of each transmission phase-shift element employ a board of Arlon BiClad 880 series having a relative dielectric constant of 2.2, a loss tangent of 0.0017 and a thickness of 0.254 mm Each transmission phase-shift element is formed of four dielectric layers of metal strip, and adjacent dielectric layers are separated by low loss foam. The thickness of the low loss foam is 6 mm. A line width of a first metal square ring is 1 mm and a ring width of the first metal square ring is 10 mm. The line width of a second metal square ring is 1 mm and a ring width of the second metal square ring may be changed by changing the phase delay of each transmission phase-shift element. A phase compensation range of −1 dB exceeds 300°.

In an embodiment of the present disclosure, the planar array antenna further includes a rotating device configured to control one or more phase modulation surfaces to perform a rotation.

Figure 6:
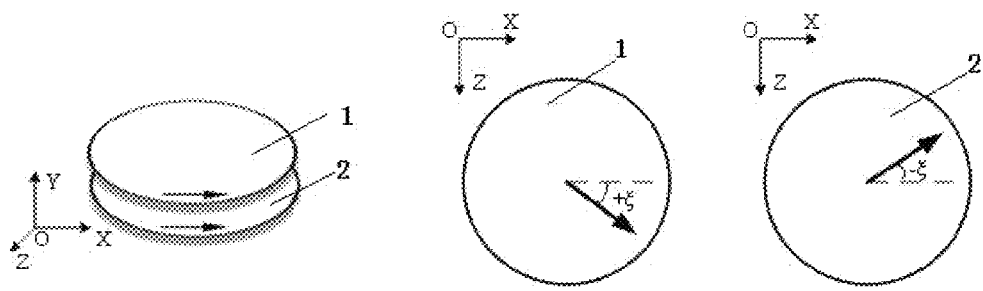
FIG. 6 is a schematic diagram illustrating an emergent beam modulated by rotating a first phase modulation surface and a second phase modulation surface according to an embodiment of the present disclosure.
Figure 7:
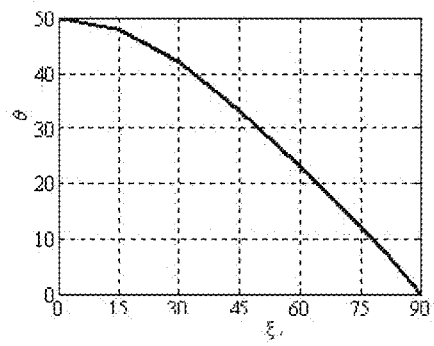
FIG. 7 is a schematic diagram illustrating a result of an emergent beam varying with a rotation angle of a phase modulation surface according to an embodiment of the present disclosure.

As shown in FIG. 6, the first phase modulation surface 1 and the second phase modulation surface 2 are rotated to different angles, such that the emergent direction of the electromagnetic wave may be changed. The first phase modulation surface 1 is rotated to an angle of +ξ, and the second phase modulation surface 2 is rotated to an angle of −ξ. An emergent angle θ of the electromagnetic wave is an intersection angle between a main beam and a Y-axis, a change thereof is shown in FIG. 7. Specifically, the emergent angle reaches a maximum deflection angle of 50 degree if ξ=0, the emergent angle reaches a deflection angle of 33 degree if ξ=45°, and the emergence angle is 0 degree if ξ=90°.

In an embodiment of the present disclosure, first transmission phases of the transmission phase-shift elements included in both of the first phase modulation surface and the second phase modulation surface are set to be distributed by gradient in columns, and a different of the first transmission phases in the adjacent columns is denoted by a formula of $$\Delta\varphi = \pi \cdot d \cdot \sin(\theta)/\lambda$$

where $\Delta\varphi$ is the difference between the first transmission phases, d is a separation distance between the adjacent columns, θ is a scanning elevation angle, and λ is a wavelength of the electromagnetic wave.

In detail, referring to FIG. 3, the transmission phases of the transmission phase-shift elements 101 in the same column are same. That is, the structures of the transmission phase-shift elements 101 in the same column are same. The sizes of the first square rings 1011 of the transmission phase-shift elements 1011 in every six columns are same, and perimeters of the second square rings 1012 increase gradually. The transmission phase-shift elements in the same column included in each phase modulation surface are set according to a formula, $\Delta\varphi = 2 \cdot \pi \cdot d \cdot \sin(\theta)/\lambda$, in which $\Delta\varphi$ is the difference between the first transmission phases of the transmission phase-shift elements in the adjacent columns, d is the separation distance between the adjacent columns, θ is the scanning elevation angle, and λ is the wavelength of the electromagnetic wave. The first phase modulation surface 1 and the second phase modulation surface 2 are set according to the above description (a manner of setting the second adjustment surface 2 is similar to the manner of setting the first adjustment surface 1) to realize an adjustment of the transmission beam angle of the electromagnetic wave. Furthermore, instead of a wedge shaped prism, the planar array with elements having a plurality of layers is employed, which not only reduces sizes and weights of the phase modulation surfaces, but also solves a problem of incident wave impedance matching.

In an embodiment of the present disclosure, final transmission phases of the transmission phase-shift elements comprised in the first phase modulation surface are set according to a formula of $$\varphi_{1i} = \varphi_i + \varphi(r_i) + \varphi_1$$

where $\varphi_{1i}$ is the final transmission phase of an $i^{th}$ transmission phase-shift element comprised in the first phase modulation surface, co is the first transmission phase of the $i^{th}$ transmission phase-shift element comprised in the first phase modulation surface, $\varphi(r_i)$ is a second transmission phase related with a distance between the $i^{th}$ transmission phase-shift element and a center of the first phase modulation surface, and $\varphi_1$ is a constant; and final transmission phases of the transmission phase-shift elements comprised in the second phase modulation surface are set according to a formula of $$\varphi_{2i} = \varphi_i - \varphi(r_i) + \varphi_2$$

where $\varphi_{2i}$ is the final transmission phase of an $i^{th}$ transmission phase-shift element comprised in the second phase modulation surface, $\varphi_i$ is the first transmission phase of the $i^{th}$ transmission phase-shift element comprised in the second phase modulation surface, $\varphi(r_i)$ is the second transmission phase related with the distance between the $i^{th}$ transmission phase-shift element and a center of the second phase modulation surface, and $\varphi_2$ is a constant.

In addition, other structures of the planar array with a changeable beam angle according to embodiments of the present are known by those skilled in the art, which is not elaborated for avoiding a redundancy.

In the description, terms such as "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the above terms in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A planar array antenna with a changeable beam angle, comprising:
    a plurality of phase modulation surfaces, wherein each phase modulation surface comprises an array comprising a plurality of transmission phase-shift elements; and a planar power source, configured to power the plurality of phase modulation surfaces, wherein each phase modulation surface is configured to modulate a transmission phase of an electromagnetic wave based on the plurality of transmission phase-shift elements, and the plurality of phase modulation surfaces are controlled to change a relative position to change the beam angle based on the corresponding transmission phases, an absolute value of a magnitude of a transmission coefficient of each transmission phase-shift element is less than 1, and a transmission phase of each transmission phase-shift element is adjustable in a range from 0 degree to 360 degree, and each transmission phase-shift element comprises a four-layer double-square-ring element, a three-layer spiral-dipole element or a perforated medium element, the plurality of phase modulation surfaces comprise a first phase modulation surface and a second phase modulation surface, first transmission phases of the transmission phase-shift elements comprised in both of the first phase modulation surface and the second phase modulation surface are set to be distributed by gradient in columns, and a different of the first transmission phases in the adjacent columns is denoted by a formula of $\Delta\varphi = \pi \cdot d \cdot \sin(\theta)/\lambda$ where $\Delta\varphi$ is the difference between the first transmission phases, d is a separation distance between the adjacent columns, $\theta$ is a scanning elevation angle, and $\lambda$ is a wavelength of the electromagnetic wave;

final transmission phases of the transmission phase-shift elements comprised in the first phase modulation surface are set according to a formula of $\varphi_{1i} = \varphi_i + \omega(r_i) + \varphi_1$ where $\varphi_{1i}$ is the final transmission phase of an $i^{th}$ transmission phase-shift element comprised in the first phase modulation surface, $\varphi_i$ is the first transmission phase of the $i^{th}$ transmission phase-shift element comprised in the first phase modulation surface, $\varphi(r_i)$ is a second transmission phase related with a distance between the $i^{th}$ transmission phase-shift element and a center of the first phase modulation surface, and $\varphi_1$ is a constant; and final transmission phases of the transmission phase-shift elements comprised in the second phase modulation surface are set according to a formula of $\varphi_{2i} = \varphi_i - \varphi(r_i) + \varphi_2$ where $\varphi_{2i}$ is the final transmission phase of an $i^{th}$ transmission phase-shift element comprised in the second phase modulation surface, $\varphi_i$ is the first transmission phase of the $i^{th}$ transmission phase-shift element comprised in the second phase modulation surface, $\varphi(r_i)$ is the second transmission phase related with the distance between the $i^{th}$ transmission phase-shift element and a center of the second phase modulation surface, and $\varphi_2$ is a constant.

2. The planar array antenna according to claim 1, further comprising:

a rotating device, configured to rotate each or all of the plurality of phase modulation surfaces.

3. The planar array antenna according to claim 1, wherein the planar power source comprises, a micro strip array, a flat plate array, or a slot array, and the planar power source is a near-field power source.

* * * * *